United States Patent
Kelley et al.

(10) Patent No.: US 7,952,466 B2
(45) Date of Patent: May 31, 2011

(54) METHOD AND SYSTEM FOR PROTECTING RFID TAGS ON PURCHASED GOODS

(75) Inventors: Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 11/548,489

(22) Filed: Oct. 11, 2006

(65) Prior Publication Data

US 2008/0106385 A1    May 8, 2008

(51) Int. Cl.
H04Q 5/22 (2006.01)
(52) U.S. Cl. .................. 340/10.3; 340/572.3; 340/572.8; 455/41.2
(58) Field of Classification Search .................. 340/10.3, 340/572.3, 572.8; 455/41.2
See application file for complete search history.

(56) References Cited

U.S. PATENT DOCUMENTS

| | | | |
|---|---|---|---|
| 6,317,028 B1 | 11/2001 | Valiulis | |
| 6,933,848 B1 | 8/2005 | Stewart et al. | |
| 7,000,834 B2 | 2/2006 | Hind et al. | |
| 7,083,085 B1 * | 8/2006 | Daniels et al. | 235/380 |
| 7,212,637 B2 * | 5/2007 | Salisbury | 380/270 |
| 7,307,534 B2 * | 12/2007 | Pesavento | 340/572.1 |
| 7,324,648 B1 * | 1/2008 | Deaver et al. | 380/278 |
| 7,370,190 B2 * | 5/2008 | Calhoon et al. | 713/2 |
| 7,429,926 B1 * | 9/2008 | Drimer | 340/572.7 |
| 7,584,322 B2 * | 9/2009 | Amtmann | 711/102 |
| 2001/0027439 A1 * | 10/2001 | Holtzman et al. | 705/39 |
| 2002/0184509 A1 * | 12/2002 | Scheidt et al. | 713/185 |
| 2005/0154924 A1 * | 7/2005 | Scheidt et al. | 713/202 |
| 2005/0242950 A1 | 11/2005 | Lindsay et al. | |
| 2005/0242957 A1 | 11/2005 | Lindsay et al. | |
| 2005/0289061 A1 * | 12/2005 | Kulakowski et al. | 705/50 |
| 2006/0059367 A1 * | 3/2006 | Yarvis | 713/189 |
| 2006/0061475 A1 | 3/2006 | Moskowitz et al. | |
| 2006/0124737 A1 | 6/2006 | Oh et al. | |
| 2006/0132313 A1 * | 6/2006 | Moskowitz | 340/572.7 |
| 2006/0234631 A1 * | 10/2006 | Dieguez | 455/41.2 |
| 2007/0069851 A1 * | 3/2007 | Sung et al. | 340/5.1 |
| 2007/0069852 A1 * | 3/2007 | Mo et al. | 340/5.1 |
| 2007/0085689 A1 * | 4/2007 | Brommer et al. | 340/572.8 |
| 2007/0096918 A1 * | 5/2007 | Badillo et al. | 340/572.8 |
| 2007/0122004 A1 * | 5/2007 | Brown et al. | 382/115 |
| 2007/0168623 A1 * | 7/2007 | Amtmann | 711/154 |
| 2007/0194945 A1 * | 8/2007 | Atkinson | 340/825.72 |
| 2007/0293197 A1 * | 12/2007 | Ekberg et al. | 455/414.1 |
| 2008/0106385 A1 * | 5/2008 | Kelley et al. | 340/10.5 |
| 2008/0191878 A1 * | 8/2008 | Abraham | 340/572.1 |

* cited by examiner

Primary Examiner — George A Bugg
Assistant Examiner — Bradley E Thompson
(74) Attorney, Agent, or Firm — Cantor Colburn LLP

(57) ABSTRACT

A method for controlling access to data contained within a radio frequency identification (RFID) tag associated with an item includes reading the RFID tag; receiving a first value from a personal communication device associated with a purchaser of the item; creating a key using the first value received from the personal communication device and a second value associated with the item; and initially transmitting the key to both the RFID tag and the personal communication device. The RFID tag is configured to automatically program one or more electrically programmable fuse devices therein so as to prevent subsequent reading of data therein by an RFID reading device, upon receipt of a valid key initially transmitted thereto. The RFID tag is further configured to automatically program one or more additional fuse devices therein so as to restore read access to the data therein, upon receipt of a valid key subsequently transmitted thereto.

15 Claims, 5 Drawing Sheets

METHOD AND SYSTEM FOR PROTECTING RFID TAGS ON PURCHASED GOODS

BACKGROUND

The present invention relates generally to radio frequency identification (RFID) technology, and, more particularly, to a method and system for protecting RFID tags on purchased goods.

The use of radio frequency identification (RFID) devices in the retail industry has started to become wide spread as retailers have realized the potential of these small and inexpensive devices. An RFID tag, which can be placed onto a product offered for sale, can permit the retailer to automatically track movement of the product, perform automatic check-out of the customer (including instant debiting of the customer's account), automatic inventory control, locating misplaced product, and so forth. The use of such RFID devices can also provide the retailers with information regarding the customers themselves, such as their purchasing habits, their movement patterns through the retail store, and so on.

RFID devices that are implanted onto products (commonly referred to as RFID tags) are typically powerless radios (although in some applications, the RFID tags can have an external power source, such as a battery for example) with a small amount of memory and perhaps a controller or a processor. The RFID tags receive power only when they are energized by RF signals from a RFID reader. In this type of device, a rectifier coupled to an antenna in the RFID tag converts energy in the RF signals into electrical energy to power the RFID tag. Once powered, the RFID tag can respond to probes from the RFID reader and thereafter provide information stored in its memory or execute instructions provided by the RFID reader.

SUMMARY

The foregoing discussed drawbacks and deficiencies of the prior art are overcome or alleviated by, in an exemplary embodiment, a method for controlling access to data contained within a radio frequency identification (RFID) tag associated with an item, including reading the RFID tag; receiving a first value from a personal communication device associated with a purchaser of the item; creating a key using the first value received from the personal communication device and a second value associated with the item; and initially transmitting the key to both the RFID tag and the personal communication device. The RFID tag is configured to automatically program one or more electrically programmable fuse devices therein so as to prevent subsequent reading of data therein by an RFID reading device, upon successful receipt of a valid key initially transmitted thereto. The RFID tag is further configured to automatically program one or more additional fuse devices therein so as to restore read access to the data therein, upon successful receipt of a valid key subsequently transmitted thereto.

In another embodiment, a method for disabling access to data contained within a radio frequency identification (RFID) tag associated with an item includes reading the RFID tag; receiving a first value from a personal communication device associated with a purchaser of the item; creating an encrypted key using the first value received from the personal communication device and a second value associated with the item; and initially transmitting the key to both the RFID tag and the personal communication device; wherein the RFID tag is configured to automatically program one or more electrically programmable fuse devices therein so as to prevent subsequent reading of data therein by an RFID reading device, upon receipt of a valid key initially transmitted thereto.

In another embodiment, a method for restoring access to data contained within a disabled radio frequency identification (RFID) tag associated with an item includes selecting the disabled RFID tag from a list of one or more disabled RFID tags stored on a personal communication device; accessing an encrypted key stored on the personal communication device, the encrypted key associated with the selected disabled RFID tag; and transmitting the encrypted key to the disabled RFID tag; wherein the RFID tag is configured to automatically program one or more electrically programmable fuse devices therein so as to restore read access to the data therein upon a match between the encrypted key transmitted by the personal communication device and a stored key within the RFID tag.

In still another embodiment, a system for selectively enabling and disabling access to data contained within a radio frequency identification (RFID) tag associated with an item an RFID reading device in communication with a point of sale (POS) computing device; the POS computing device configured to receive a first value sent from a personal communication device associated with a purchaser of the item, and to create a key using the first value received from the personal communication device and using a second value associated with the item; the POS computing device further configured to transmit the key to both the RFID tag and the personal communication device; wherein the RFID tag is configured to automatically program one or more electrically programmable fuse devices therein so as to prevent subsequent reading of data therein by an RFID reading device, upon receipt of a valid key initially transmitted thereto; and wherein the RFID tag is further configured to automatically program one or more additional fuse devices therein so as to restore read access to the data therein, upon receipt of a valid key subsequently transmitted thereto.

BRIEF DESCRIPTION OF THE DRAWINGS

Referring to the exemplary drawings wherein like elements are numbered alike in the several Figures.

DETAILED DESCRIPTION

Disclosed herein is a method and system of selectively disabling and subsequently restoring the ability to read data stored on an RFID tag, wherein the tag is configured with a self-programmable fuse technology that makes and breaks electrical connections within the device. Although the disabling action renders the RFID tag unreadable, it does not destroy the data itself. Therefore, a purchaser of an RFID item has the additional capability of subsequently rendering the RFID tag readable again through successful implementation of a restore operation.

Briefly stated, an encrypted "disable" key is sent to an RFID tag located on an RFID item at the time of purchase, wherein the key is a combination of values; one associated with the item itself, and another associated with a customer's personal communication device. This disable key is also sent to and stored within the user's device. If the portion of the disable key corresponding to the RFID item matches the value stored in the RFID tag, then a fuse is automatically blown in a portion of the RFID circuit used to store the information about the purchased item.

This may be implemented using, for example, electrically programmable (eFuse) technology developed by IBM. This technology utilizes a combination of unique software algorithms and microscopic electrical fuses to help chips regulate and adapt to changing conditions and system demands by adjusting their circuitry. Particularly, an eFuse device may be programmed by passing a sufficient current through the structure such that its resistance is significantly altered from its initially fabricated state.

The use of an encrypted disable value also protects the seller from a third party sending a rogue disable value to render the RFID tag unreadable prior to purchasing of the item containing the RFID tag. In addition, the exemplary system and method described hereinafter further provides the capability of restoring the readability of the RFID tag information in the event a valid item return/exchange is to take place. The customer uses the personal communication device to send the stored encrypted key information back to the RFID tag, wherein another electrically programmable fuse (or antifuse) device is blown (i.e., programmed) in another portion of the RFID circuit so as to once again provide access to the RFID data stored in the tag.

Figure 1:
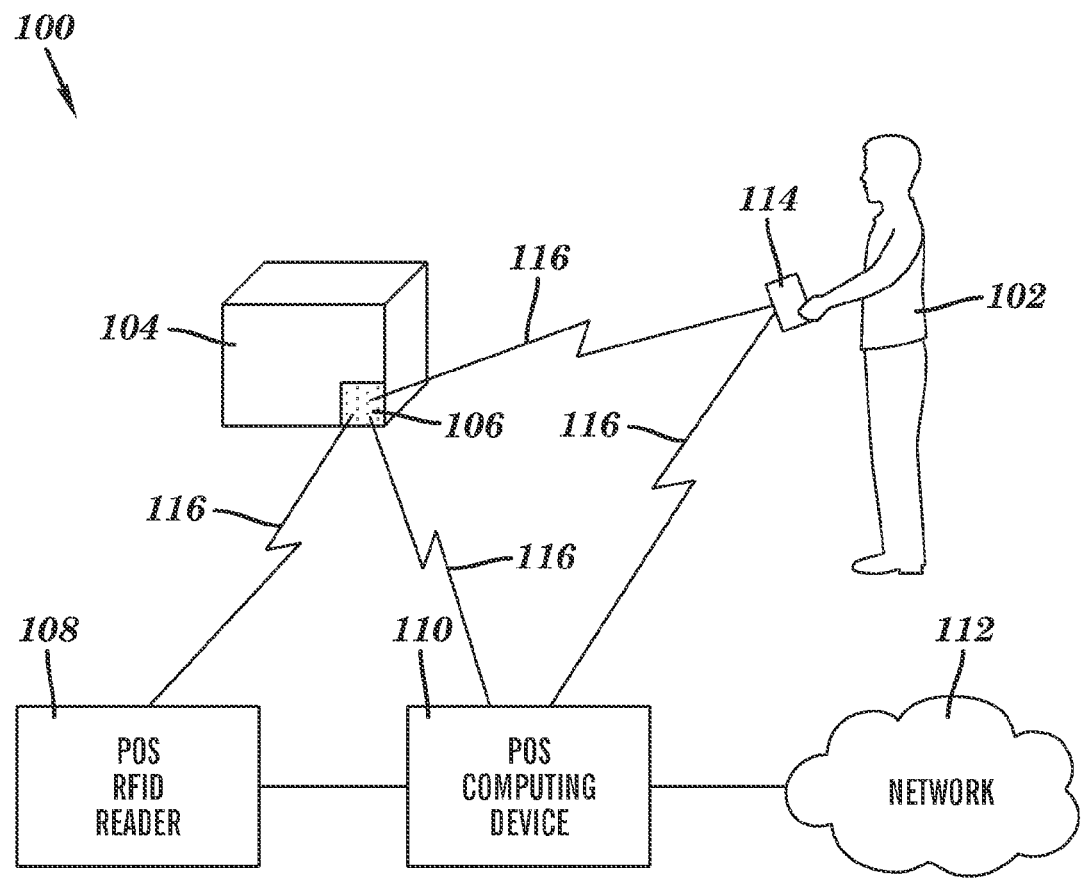
FIG. 1 is a schematic diagram of an exemplary RFID system suitable for use in accordance with an embodiment of the invention.

Referring initially to FIG. 1, there is shown an exemplary RFID communication system 100 suitable for use in accordance with an embodiment of the invention. A person 102 (e.g., store customer) purchases at least one tagged item 104, which in turn has at least one wireless or RFID tag 106 attached to the item 104. The RFID tag 106 is capable of being interrogated by an RFID reader 108 which may be located at a point-of-sale (POS) terminal, the RFID reader 108 in communication with a POS computing device 110. The POS computing device 110 may, for example, be configured to receive and process information read by the RFID reader 108, and store the information in a database. In addition, the POS system may include a connection to a network 112, which makes possible the exchange of information with other computing systems. It should be noted that although the RFID reader 108 and POS computing device 110 are depicted as separate devices, the functions thereof could also be integrated within a single computing device.

As further illustrated in FIG. 1, the customer 102 possesses a personal communication device 114 which may be, for example, a cellular phone or personal digital assistant (PDA) capable of wireless communication. As described in greater detail below, various wireless communication paths 116 are depicted in FIG. 1 to represent possible communication paths between the RFID tag 106, the RFID reader 108, the POS computing device 110 and the customer's personal communication device 114.

Figure 2A:
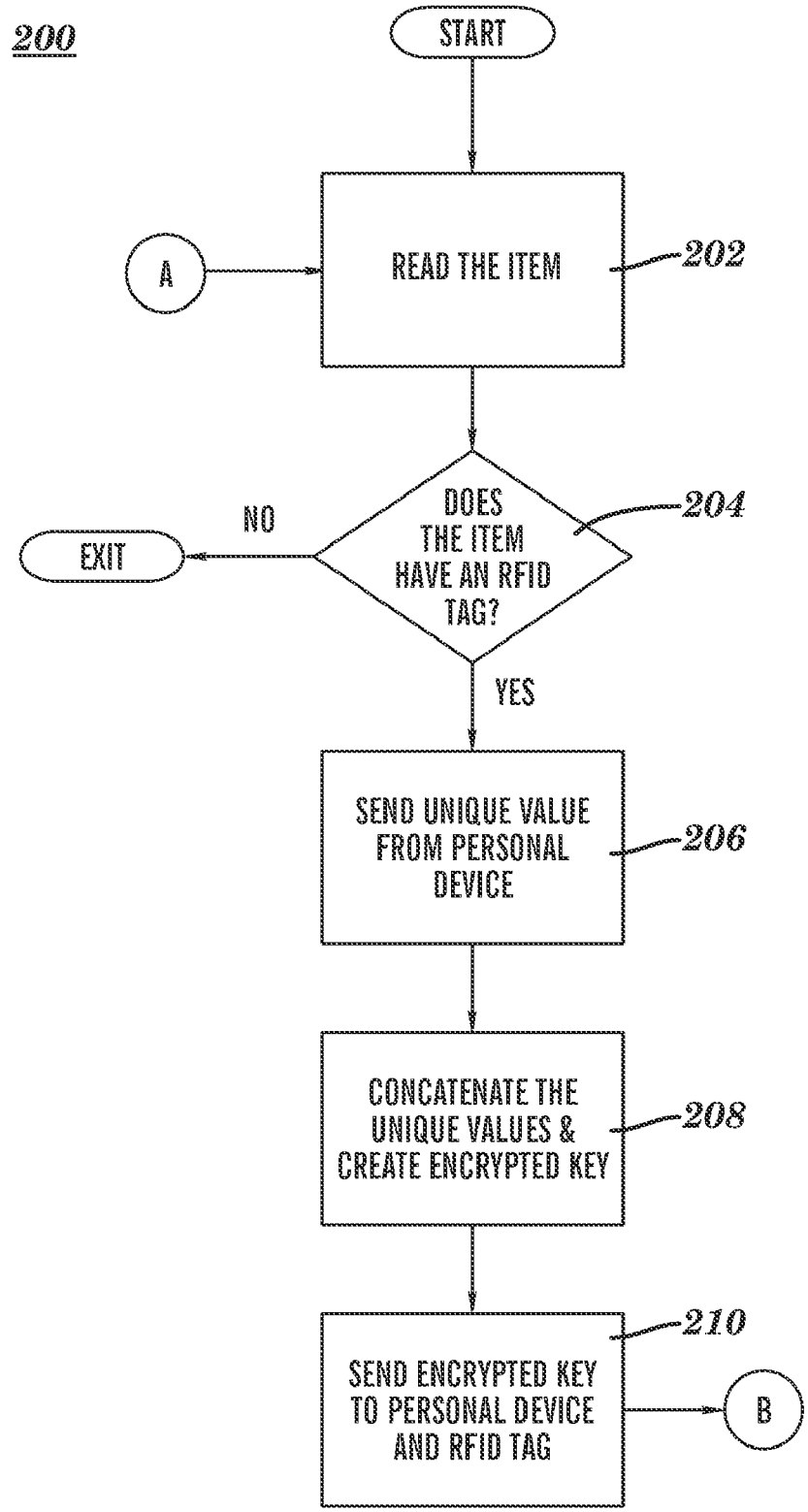
FIGS. 2(a) and 2(b) are a flow diagram illustrating a method for implementing an encrypted disable operation for an RFID tag, in accordance with an embodiment of the invention.
Figure 2B:
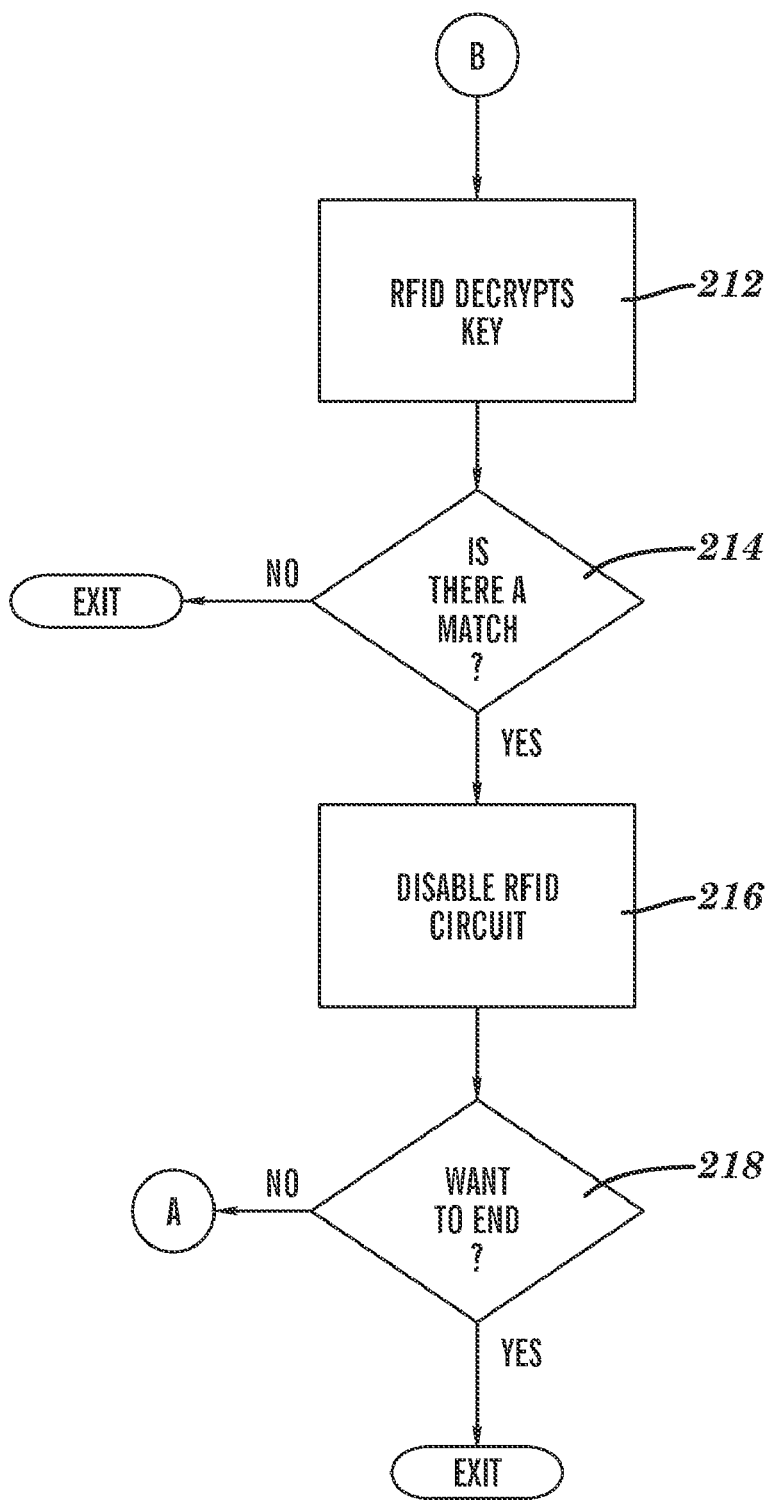

Referring now to FIGS. 2(a) and 2(b), there is shown a flow diagram illustrating a method 200 for implementing an encrypted disable operation for an RFID tag, in accordance with an embodiment of the invention. As specifically illustrated in block 202 of FIG. 2(a), the method 200 is initiated by reading the item 104 using the RFID reader 108. If at decision block 204 it is determined that the item 104 does not have an RFID tag 106 associated therewith, the disable process goes no further. On the other hand, if the item 104 does include an RFID tag 106, then the method 200 proceeds block 206, wherein the POS computing device 110 receives a first unique value sent from the customer's personal communication device 114.

This first unique value is used by the POS computing device 110 recording the sale to create an encrypted key that consists of two parts. The first part of the key is a second unique value corresponding to the RFID item 104 to be purchased, which may retrieved from a database by the computer registering the sale. The second part the encrypted key is the first unique value received from the purchaser's personal communication device 114. In an exemplary embodiment, the POS computing device 110 concatenates the two unique values and encrypts them to create the key, as shown in block 208. Then, in block 210, the encrypted key is sent from the POS computing device 110 to both the customer's personal communication device 114 and the RFID tag 106.

Referring specifically now to FIG. 2(b), the method 200 proceeds to block 212, wherein the RFID tag 106 then decrypts the key and compares the first part of the decrypted concatenated value received from the POS computing device 110 to a stored value therein. If, at decision block 214, the first part of the key (i.e., the second unique value corresponding to the particular RFID item 104) does not match the value stored in the RFID tag 106, the process exits with no further action. This feature prevents the unintended disabling of other RFID tags that may be within the communication range of the POS computing device 110.

On the other hand, if there is a match, then the combined concatenated value will be stored in the RFID tag 106, and software stored within the tag 106 will the initiate the programmable fuse technology (e.g., eFuse) associated therewith to disable the RFID tag so as to render the data therein unreadable by any RFID reading device, as shown in block 216. For example, the RFID tag software may initiate a self-reprogramming sequence in which one or more fuses within in the tag 106 are blown so as to cut off access to the data stored therein. However, the data itself is not erased or destroyed by this process. Finally, decision block 218 reflects whether there are additional RFID items to be read and disabled. If not, the process ends at that point; otherwise, the method returns back to block 202 in FIG. 2(a) to read another item.

As indicated above, the disabling of the RFID tag 106 during a purchase transaction prevents unauthorized reading of the tag data by a third party possessing RFID reading equipment. However, as also indicated above, it may become desirable (at the purchaser's discretion) to render the RFID tag 106 readable again. Thus, FIGS. 3(a) and 3(b) are a flow diagram illustrating a method 300 for implementing a restore operation for an RFID item that has been previously disabled according to the process of FIGS. 2(a) and 2(b), in accordance with a further embodiment of the invention.

Figure 3A:
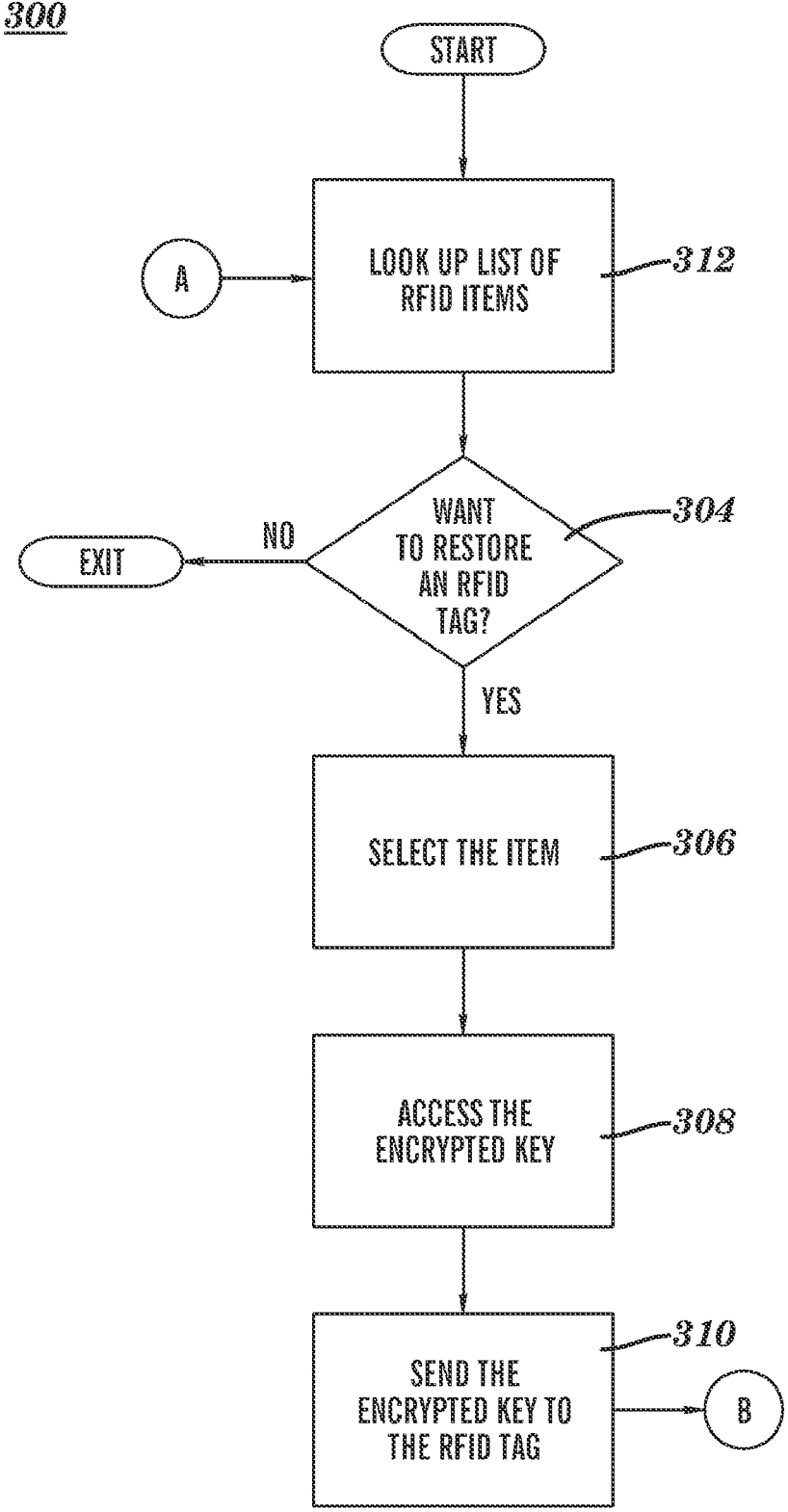
FIGS. 3(a) and 3(b) are a flow diagram illustrating a method for implementing a restore operation for the encrypted disable operation of FIGS. 2(a) and 2(b), in accordance with a further embodiment of the invention.

As specifically shown in FIG. 3(a), the method 300 begins at block 302, wherein the customer 102 uses the personal communication device 114 to access a list of RFID items that have been purchased and the tags disabled in accordance with the process described above. If at decision block 304 it is determined that the purchaser 102 does not wish to restore the readability of any disabled RFID tags, then the restore process goes no further. On the other hand, if it is desired to restore the readability of at least one RFID tag 106, then the method 300 proceeds block 306, where a specific RFID item is selected. Once selected, the encrypted key associated with the particular RFID tag 106 is accessed by the personal communication device 114, as shown in block 308. It will be recalled that during the disable routine, the encrypted key sent by the POS computing device 110 is stored in both the RFID tag 106 and the personal communication device 114. Then, as shown in block 310, the customer 102 uses the personal communication device 114 to send the encrypted key to the RFID tag 106 to be restored.

Figure 3B:
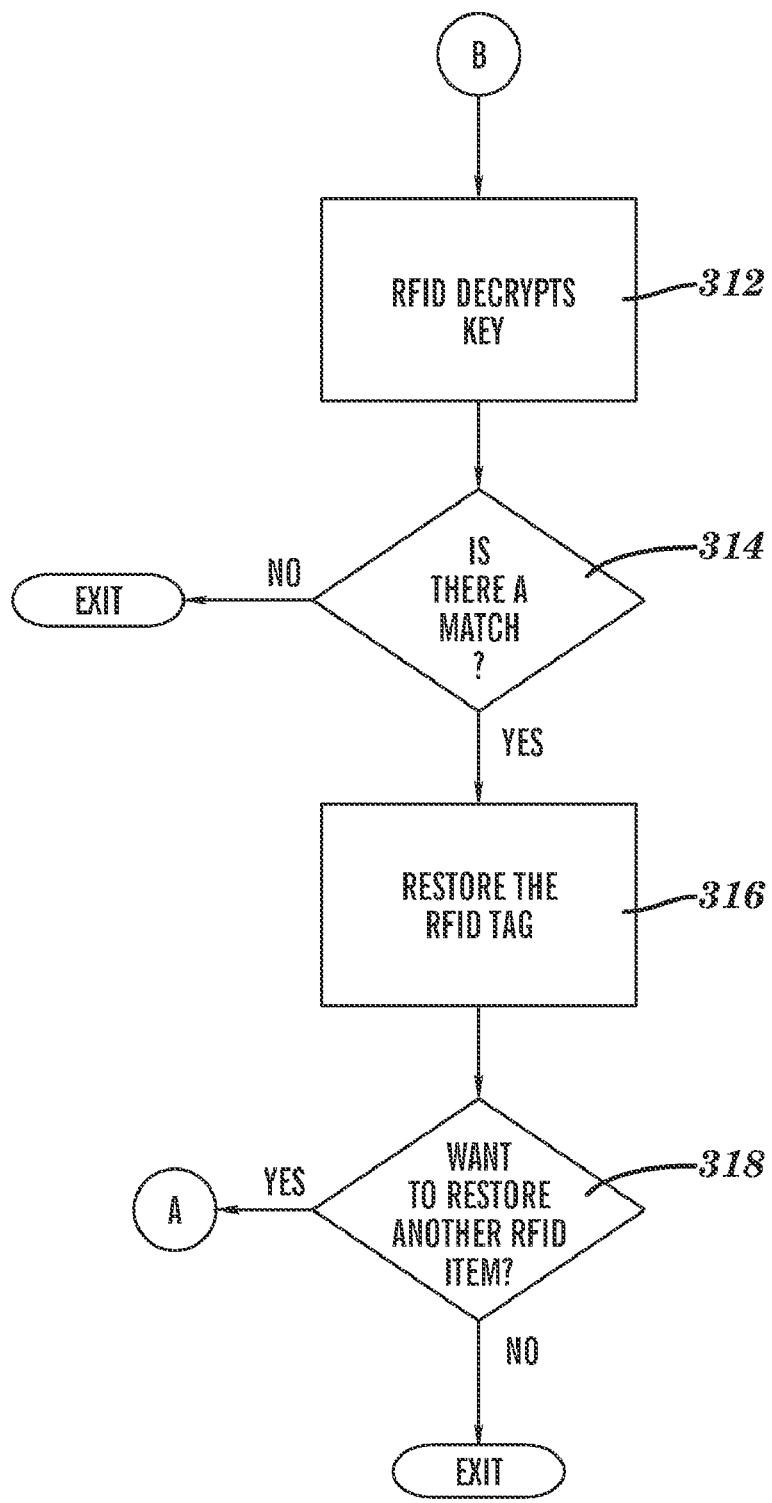

Referring specifically now to FIG. 3(b), the method 300 proceeds to block 312, wherein the RFID tag 106 then decrypts the key sent from the customer's personal communication device 114 and compares this key to the one stored therein. Once again, the key represents the combination (concatenation) of a second unique value corresponding to the RFID item 104 and a first unique value originally sent from the customer's personal communication device 114. If, at decision block 314, the key sent from the customer's personal communication device 114 does not match the key stored in the RFID tag 106, the process exits with no further action.

However, if a match does exist, then the process 300 proceeds to block 316 where the readability is automatically restored by the RFID tag 106. In the exemplary embodiment of eFuse technology described above, this may be accomplished through software initiated blowing of an additional fuse(s) or antifuse(s) within the tag 106 that restores access to the RFID data. Finally, decision block 318 reflects whether there are additional RFID items to be restored. If not, the process ends at that point; otherwise, the method returns back to block 302 in FIG. 3(a) to access the list of other disabled RFID items.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling access to data contained within a radio frequency identification (RFID) tag associated with an item, the method comprising:
    reading the RFID tag;
    receiving a first value from a personal communication device associated with a purchaser of the item;
    creating a key using the first value received from the personal communication device and using a second value associated with the item, the second value not associated with the purchaser; and
    initially transmitting the key to both the RFID tag and the personal communication device;
    wherein the RFID tag is configured to automatically program one or more electrically programmable fuse devices therein so as to prevent subsequent reading of data therein by an RFID reading device, upon receipt of a valid key initially transmitted thereto;
    wherein the RFID tag is further configured to automatically program one or more additional fuse devices therein so as to restore read access to the data therein, upon receipt of a valid key subsequently transmitted thereto; and
    wherein creating the key further comprises concatenating the first and second values and encrypting the concatenated values.

2. The method of claim 1, wherein the RFID tag is configured to decrypt the key and determine whether the second value included within the key matches a unique value associated with the item, the unique value being stored within the RFID tag.

3. The method of claim 2, wherein the RFID tag is configured to disable access to the RFID tag data only when the second value included within the key matches a unique value associated with the item.

4. The method of claim 1, wherein the RFID tag is configured to decrypt the key sent from the personal communication device, following initial disabling of access to the RFID tag data, and determine whether both the first and second values of the decrypted key matches the corresponding first and second values of the key initially transmitted thereto in disabling the access to the RFID tag data.

5. The method of claim 4, wherein the RFID tag is configured to restore access to the RFID tag data only when the first and second values included within the key sent from the personal communication device matches the corresponding first and second values of the key initially transmitted thereto in disabling the access to the RFID tag data.

6. A method for disabling access to data contained within a radio frequency identification (RFID) tag associated with an item, the method comprising:
    reading the RFID tag;
    receiving a first value from a personal communication device associated with a purchaser of the item;
    creating an encrypted key using the first value received from the personal communication device and using a second value associated with the item, the second value not associated with the purchaser; and
    initially transmitting the key to both the RFID tag and the personal communication device;
    wherein the RFID tag is configured to automatically program one or more electrically programmable fuse devices therein so as to prevent subsequent reading of data therein by an RFID reading device, upon receipt of a valid key initially transmitted thereto; and
    wherein creating the encrypted key further comprises concatenating the first and second values and encrypting the concatenated values.

7. The method of claim 6, wherein the RFID tag is configured to decrypt the key and determine whether the second value included within the key matches a unique value associated with the item, the unique value being stored within the RFID tag.

8. The method of claim 7, wherein the RFID tag is configured to disable access to the RFID tag data only when the second value included within the key matches a unique value associated with the item.

9. A method for restoring access to data contained within a disabled radio frequency identification (RFID) tag associated with an item, the method comprising:
    selecting the disabled RFID tag from a list of one or more disabled RFID tags stored on a personal communication device;

accessing an encrypted key stored on the personal communication device, the encrypted key associated with the selected disabled RFID tag; and transmitting the encrypted key to the disabled RFID tag;

wherein the RFID tag is configured to automatically program one or more electrically programmable fuse devices therein so as to restore read access to the data therein upon a match between the encrypted key transmitted by the personal communication device and a stored key within the RFID tag; and wherein the encrypted key comprises concatenated first and second values, the first value associated with the personal communication device and the second value associated with the item, not the personal communication device.

10. The method of claim 9, wherein the encrypted key stored on the personal communication device is initially received from a point of sale (POS) computing device used to create the encrypted key, as part of a process used to disable the RFID tag.

11. A system for selectively enabling and disabling access to data contained within a radio frequency identification (RFID) tag associated with an item, comprising:

an RFID reading device in communication with a point of sale (POS) computing device;

the POS computing device configured to receive a first value sent from a personal communication device associated with a purchaser of the item, and to create a key using the first value received from the personal communication device and using a second value associated with the item, the second value not associated with the purchaser; and the POS computing device further configured to transmit the key to both the RFID tag and the personal communication device;

wherein the RFID tag is configured to automatically program one or more electrically programmable fuse devices therein so as to prevent subsequent reading of data therein by an RFID reading device, upon receipt of a valid key initially transmitted thereto;

wherein the RFID tag is further configured to automatically program one or more additional fuse devices therein so as to restore read access to the data therein, upon receipt of a valid key subsequently transmitted thereto; and wherein the POS computing device is configured to create the key by concatenating the first and second values and encrypting the concatenated values.

12. The system of claim 11, wherein the RFID tag is configured to decrypt the key and determine whether the second value included within the key matches a unique value associated with the item, the unique value being stored within the RFID tag.

13. The system of claim 12, wherein the RFID tag is configured to disable access to the RFID tag data only when the second value included within the key matches a unique value associated with the item.

14. The system of claim 11, wherein the RFID tag is configured to decrypt the key sent from the personal communication device, following initial disabling of access to the RFID tag data, and determine whether both the first and second values of the decrypted key matches the corresponding first and second values of the key initially transmitted thereto in disabling the access to the RFID tag data.

15. The system of claim 14, wherein the RFID tag is configured to restore access to the RFID tag data only when the first and second values included within the key sent from the personal communication device matches the corresponding first and second values of the key initially transmitted thereto in disabling the access to the RFID tag data.

* * * * *